US006305013B1

United States Patent
Miyamoto

(10) Patent No.: US 6,305,013 B1
(45) Date of Patent: Oct. 16, 2001

(54) COMPILING METHOD FOR GENERATING TARGET PROGRAM IN ACCORDANCE WITH TARGET PROCESSOR TYPE, COMPILING DEVICE, RECORDING MEDIUM WITH COMPILING PROGRAM RECORDED THEREIN AND RECORDING MEDIUM WITH CONVERSION TABLE USED IN COMPILING RECORDED THEREIN

(75) Inventor: Takashi Miyamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/285,039

(22) Filed: Apr. 1, 1999

(30) Foreign Application Priority Data

Apr. 1, 1998 (JP) ................................. 10-089087

(51) Int. Cl.[7] ........................................ G06F 9/45
(52) U.S. Cl. ....................................... 717/7; 717/9
(58) Field of Search ............................. 717/5, 7, 9

(56) References Cited

U.S. PATENT DOCUMENTS

| 5,355,491 | * | 10/1994 | Lawlor et al. | 717/7 |
| 5,375,242 | * | 12/1994 | Kumar et al. | 717/7 |
| 5,488,569 | * | 1/1996 | Kaplan et al. | 709/228 |
| 5,606,697 | * | 2/1997 | Ono | 717/7 |
| 5,768,593 | * | 6/1998 | Walters et al. | 717/5 |
| 5,905,891 | * | 5/1999 | Harada et al. | 717/5 |
| 6,233,732 | * | 5/2001 | Matsuyama et al. | 717/7 |

FOREIGN PATENT DOCUMENTS

| 2-50730 | | 2/1990 | (JP) . |
| 03-002933 | * | 9/1991 | (JP) . |
| 3-252820 | | 11/1991 | (JP) . |
| 4-14144 | | 1/1992 | (JP) . |
| 4-322329 | | 11/1992 | (JP) . |
| 6-332719 | | 12/1994 | (JP) . |
| 1-287743 | | 11/1998 | (JP) . |

OTHER PUBLICATIONS

Leong et al., "A Transportable Programming Language (TPL) System–II: The Bifunctional Compiler System," IEEE Transactions on Software Engineering, vol. 16, Issue 6, Jun. 1990, pp. 639–646.*

* cited by examiner

Primary Examiner—Tuan Q. Dam
(74) Attorney, Agent, or Firm—Foley & Lardner

(57) ABSTRACT

There is disclosed a compiling method of generating a code of a target program operable in a desired target processor, in which an amount of operations required for the code generation is reduced. Specifically, a code generating section 18 comprises a first converting section 22 and a second converting section 26. The first converting section 22 refers to a first conversion table stored in a first storage device 24 to generate a low-level code 30 from a high-level code 20, while the second converting section 26 refers to a second conversion table stored in a second storage device 28 to generate an output code 14 from the low-level code 30. In the second conversion table, output codes indicating the same or similar function are associated to the common low-level code.

15 Claims, 14 Drawing Sheets

FIG.3

| HIGH-LEVEL CODE | LOW-LEVEL CODE |
|---|---|
| cmp_and_br_LT | CMPLT,BNEQ |
| relop_EQ_float | CMPFEQU,BFF |
| cmp_and_br_LE | CMPLT,EBEQU |
| cmp_and_br_GE | CMPLT,BEQU |
| cmp_and_br_GT | CMPLT,EBNEQ |
| ... | ... |

32:FIRST CONVERSION TABLE

FIG.5

| LOW-LEVEL CODE | TARGET COMMAND | OPERAND | | |
|---|---|---|---|---|
| | | FIRST | SECOND | THIRD |
| CMPLT | lt. w | reg/imm | reg | reg |
| CMPFEQU | cmpeq. s | none | freg | freg |
| BNEQ | jne | reg | reg | lab |
| BFF | jff | lab | none | none |
| BEQU | jeq | reg | reg | lab |
| EBNEQ | jne | reg | reg | lab |
| EBEQU | jeq | reg | reg | lab |
| ... | ... | | | |

14: OUTPUT CODE (36, 38)
30
34a: SECOND CONVERSION TABLE

FIG.10

44: FIRST CONVERSION TABLE

| HIGH-LEVEL CODE | | | | LOW-LEVEL CODE | | | |
|---|---|---|---|---|---|---|---|
| HIGH-LEVEL CODE COMMAND | OPERAND | | | LOW-LEVEL CODE COMMAND | OPERAND | | |
| | FIRST | SECOND | THIRD | | FIRST | SECOND | THIRD |
| ADD_M_M | mem1 | mem2 | reg $ | LDW | mem1 | treg1 | |
| | | | | LDW | mem2 | treg2 | |
| | | | | ADD | treg1 | treg2 | treg $ |

FIG.11A

46:SECOND CONVERSION TABLE

| LOW-LEVEL CODE | | | | OUTPUT CODE | | | |
|---|---|---|---|---|---|---|---|
| LOW-LEVEL CODE COMMAND | OPERAND | | | OUTPUT CODE COMMAND | OPERAND | | |
| | FIRST | SECOND | THIRD | | FIRST | SECOND | THIRD |
| LDW | mem | reg | | ld.w | mem | reg | |
| ADD | reg 1 | reg 2 | reg 3 | add | reg 1 | reg 2 | reg 3 |

FIG.11B

46a:SECOND CONVERSION TABLE

| LOW-LEVEL CODE | | | | OUTPUT CODE | | | |
|---|---|---|---|---|---|---|---|
| LOW-LEVEL CODE COMMAND | OPERAND | | | OUTPUT CODE COMMAND | OPERAND | | |
| | FIRST | SECOND | THIRD | | FIRST | SECOND | THIRD |
| LDW | mem | reg | | lw | reg | mem | |
| ADD | reg 1 | reg 2 | reg 3 | add | reg 3 | reg 1 | reg 2 |

FIG.12A

48:SECOND CONVERSION TABLE

| LOW-LEVEL CODE | | | | OUTPUT CODE | | | |
|---|---|---|---|---|---|---|---|
| LOW-LEVEL CODE COMMAND | OPERAND | | | OUTPUT CODE COMMAND | OPERAND | | |
| | FIRST | SECOND | THIRD | | FIRST | SECOND | THIRD |
| ANDI | imm | reg 1 | reg 2 | andi | imm | reg 1 | reg 2 |

FIG.12B

48a:SECOND CONVERSION TABLE

| LOW-LEVEL CODE | | | | OUTPUT CODE | | | |
|---|---|---|---|---|---|---|---|
| LOW-LEVEL CODE COMMAND | OPERAND | | | OUTPUT CODE COMMAND | OPERAND | | |
| | FIRST | SECOND | THIRD | | FIRST | SECOND | THIRD |
| ANDI | imm | reg 1 | reg 2 | andi | reg 2 | posimm | reg 1 |

COMPILING METHOD FOR GENERATING TARGET PROGRAM IN ACCORDANCE WITH TARGET PROCESSOR TYPE, COMPILING DEVICE, RECORDING MEDIUM WITH COMPILING PROGRAM RECORDED THEREIN AND RECORDING MEDIUM WITH CONVERSION TABLE USED IN COMPILING RECORDED THEREIN

BACKGROUND OF THE INVENTION

1. Field of the Invention

The present invention relates to a method of compiling a source program to generate a mechanical level program (hereinafter referred to as the target program), particularly to a method in which the target program can be generated in accordance with a type of processor (hereinafter referred to as the target processor) for operating the target program from one source program. The present invention also relates to a device for realizing the method, a recording medium in which a program for allowing a computer to execute a processing based on the method is stored, and a recording medium in which a conversion table for use in the processing based on the method is recorded.

2. Description of the Related Art

An example of a conventional compiling system is described in Japanese Patent Application Laid-Open No. Hei 6-332719. The compiling system will briefly be described as a first conventional example with reference to FIG. 13. FIG. 13 is a flowchart showing the first conventional example.

In the first conventional example, when an intermediate language code command is generated from a source program, and a code of target program is generated from the intermediate language code command, code generation means is used. A generation code table comprising at least one generation code pattern (generation code with a header attached thereto), and a content of change of the generation code pattern (dependent on program) are transmitted to the code generation means. Additionally, the header attached to the generation code indicates what change is made on the generation code.

In the compiling system, a compiler code generation device successively fetches the generation code pattern from the generation code table. Subsequently, the change content dependent on program is developed in a code in accordance with the type of the header attached to the generation code, which is formed into a code to be generated.

According to the system, for different target processors, the compiler code generation device can be prepared only by changing the content of the generation code table.

In the first conventional compiling system, however, a command for each target processor is described in the generation code table (conversion table), excluding a section in which the change content dependent on program is developed. Therefore, all generation code patterns need to be described using the command for each target processor.

As a result, in the system, in order to generate the compiler code generation device for a plurality of target processors, generation code tables need to be individually prepared for the types of target processors. Specifically, every time the target processor is changed, all the generation code patterns have to be changed. When a large number of types of target processors are to be handled, the amount of the generation code table is enormously increased, and an amount of operations necessary for generating the generation code table is disadvantageously increased.

Moreover, when the type of the target processor is changed, not only the generation code pattern but also the way of developing the change content dependent on program into the generation code are influenced. The influence is caused by a difference in architecture of the target processor. For an example of difference of architecture, in determinations of a loop upper or lower bound repeated integer times, a comparison command including an equal sign is used in some target processor, while a comparison command excluding the equal sign is used in the other target processor. In this case, an immediate value forming the loop upper or lower bound value may vary in the generation code in accordance with the type of the target processor.

In this respect, in the first conventional system, the way of developing the change content dependent on program into the generation code is limited to the way designated as a header type. Therefore, the first conventional system can only be used for a target processor group of a limited type in which the way of development is the same as a source program format. For example, in the system, a program (target program) for a microprocessor manufactured by a specified maker can be generated, but a program for a microprocessor manufactured by another maker cannot be generated. Therefore, the first conventional system has a problem that the types of target processors are limited.

Another example of the conventional compiling system is described in Japanese Patent Application Laid-Open No. Hei 4-14144. The compiling system will briefly be described as a second conventional example with reference to FIG. 14. FIG. 14 is a functional block diagram showing the second conventional example.

A compiler 100 for realizing the compiling system comprises a semantic analysis processing section 200 independent of architecture, general-purpose intermediate language optimization processing section 210, architecture-dependent processing section 220, intermediate language optimization processing section 230, code generation processing section 240, intermediate language skeleton table 120, and code generating skeleton table 130.

In the compiling system, compiling is performed as follows:

First, in the semantic analysis processing section 200, a semantic analysis processing of inputted source program 110 is performed, and a general-purpose intermediate language 140 independent of architecture is outputted. Subsequently, in the general-purpose intermediate language optimization processing section 210, if necessary, a conversion for optimization of general-purpose intermediate language is performed, and results are outputted as an optimized general-purpose intermediate language 150.

Subsequently, in the second conventional example, a processing dependent on architecture related with a conventional semantic analysis is performed in the architecture-dependent processing section 220. In the processing, an intermediate language 160 dependent on computer architecture is generated from the optimized general-purpose intermediate language 150 using the intermediate language skeleton table 120. Subsequently, in the intermediate language optimization processing section 230, the intermediate language 160 is optimized to output an optimized intermediate language 170. Subsequently, in the code generation processing section 240, a target program 180 comprising a machine language command sequence and the like is generated from the optimized intermediate language 170 using the code generating skeleton table 130.

As described above, in the second conventional compiling system, a high-performance object is generated by separating the processing dependent on computer architecture from the semantic analysis processing.

In the second conventional compiling system, however, the architecture-dependent section is separated from the semantic analysis processing. Therefore, every time the architecture is changed, the intermediate language skeleton table needs to be changed.

Moreover, in the same manner as the first prior art, also in the system, the code generating skeleton table (conversion table) is described with the command of the target processor. Therefore, description needs to be provided using each target processor command for each generation code pattern.

As a result, also in the system, for a plurality of target processors, the code generating skeleton table needs to be separately prepared for each type of target processor. Specifically, every time the target processor is changed, all code generating skeleton tables need to be changed. As a result, when a large number of types of target processors are to be handled, the amount of the code generating skeleton table disadvantageously becomes enormous. Furthermore, when the amount of code generating skeleton table is enormous, the amount of operations necessary for preparing the code generating skeleton table is disadvantageously increased.

SUMMARY OF THE INVENTION

The present invention has been developed to solve the above-mentioned problem, and an object thereof is to provide a compiling method in which a change amount of conversion table accompanied with a change of target processor type can be reduced.

To attain this and other objects, the present inventors have noticed that output codes indicating the same or similar function are usually included in output codes for a target program operated in a plurality of different target processors. They have found that when the output codes indicating the same or similar function is associated with one code of intermediate language, at least a part of the conversion table can be made common, so that the change amount of the conversion table accompanied with the change of target program can be reduced.

According to an aspect of the present invention, there is provided a compiling method comprising a front end processing step of generating a high-level code independent of a target program type from a source program, and a code generating step of generating an output code for a desired target program from the high-level code, the code generating step comprising:
  converting the high-level code to the low-level code by referring to a first conversion table prepared in common to the target program, in which the high-level code is associated with a low-level code indicating a function the same as or similar to a function indicated by the high-level code and independent of the target program; and
  converting the low-level code to the output code for the desired target program by referring to a second conversion table prepared for each target program, in which the low-level code is associated with the output code for the target program indicating a function the same as or similar to the function indicated by the low-level code.

According to another aspect of the present invention, there is provided a compiling device comprising a front end processing section for generating a high-level code independent of a target program type from a source program, and a code generating section for generating an output code for a desired target program from the high-level code, the code generating section comprising:
  a first conversion table prepared in common to the target program, in which the high-level code is associated with a low-level code indicating a function the same as or similar to a function indicated by the high-level code and independent of the target program;
  a first converting section for referring to the first conversion table to convert the high-level code to the low-level code;
  a second conversion table prepared for each target program, in which the low-level code is associated with the output code for the target program indicating a function the same as or similar to the function indicated by the low-level code; and
  a second converting section for referring to the second conversion table to convert the low-level code to the output code for the desired target program.

According to still another aspect of the present invention, there is provided a recording medium which stores a program for allowing a computer to execute a front end processing of generating a high-level code independent of a target program type from a source program, and a code generation processing of generating an output code for a desired target program from the high-level code, the code generation processing comprising:
  a processing of converting the high-level code to the low-level code by referring to a first conversion table prepared in common to the target program, in which the high-level code is associated with a low-level code indicating a function the same as or similar to a function indicated by the high-level code and independent of the target program; and
  a processing of converting the low-level code to the output code for the desired target program by referring to a second conversion table prepared for each target program, in which the low-level code is associated with the output code for the target program indicating a function the same as or similar to the function indicated by the low-level code.

According to still another aspect of the present invention, there is provided a recording medium which stores a conversion table for use in a processing of generating a high-level code independent of a target program type from a source program, and generating an output code for a desired target program from the high-level code, the conversion table comprising:
  a first conversion table prepared in common to the target program, in which the high-level code is associated with a low-level code indicating a function the same as or similar to a function indicated by the high-level code and independent of the target program; and
  a second conversion table prepared for each target program, in which the low-level code is associated with the output code for the target program indicating a function the same as or similar to the function indicated by the low-level code.

As described above, in the compiling method, compiling device and recording medium of the present invention, the second conversion table is prepared for each of different types of target programs. In each second conversion table, the output codes indicating the same or similar function are associated with the common low-level code.

Therefore, at least a part of correspondent portions of the high-level and low-level codes in the first conversion table can be used in common among the different types of target programs.

As described above, since at least a part of the conversion table can be made common, in the present invention, all the first and second conversion tables do not need to be changed when the type of the target processor is changed. For example, a part of each of the first and second conversion tables for a certain type of target processor can be used as a part of each of the first and second conversion tables (also referred to together as the conversion table) for another type of target processor. Therefore, according to the present invention, the change amount of conversion table accompanied with the change of target processor type can be reduced.

Moreover, since the change amount of conversion table can be reduced, the amount of operations for changing the conversion table can be reduced.

Furthermore, in the compiling processing method of the present invention, the first and second conversion tables are preferably stored in storage devices, respectively.

The storage device may store the first and second conversion tables for one target processor, or may store the first and second conversion tables for a plurality of target processors.

For this purpose, the compiling processing device of the present invention is preferably provided with a first storage device storing the first conversion table. Moreover, a second storage device storing the second conversion table may preferably be provided.

For example, these first and second conversion tables may be provided inside or outside the code generating section. Moreover, for example, the first and second storage devices may be constituted of two different storage areas of one storage device.

Moreover, in the compiling processing method and compiling processing device of the present invention, at least one of the first and second conversion tables is preferably stored in an external storage device.

The external storage device may store both the first and second conversion tables, only the first conversion table, or only the second conversion table.

Additionally, when the target processor type is changed, not only the generation code pattern but also the way of developing the change content dependent on program into the generation code may need to be changed. In this case, the immediate value to be developed in the generation code needs to be changed and determined based on information dependent on target processor such as a target command (operator) and operand attribute.

In this respect, in the compiling processing method, compiling processing device and recording medium of the present invention, the second conversion table preferably includes a low-level operator as the low-level code, and includes an output operator and an output operand of the output operator as the output code.

Furthermore, the second conversion table preferably includes a low-level operand of the low-level operator.

BRIEF DESCRIPTION OF THE DRAWINGS

Other features and advantages of the invention will become apparent from the detailed description hereunder, taken in conjunction with the accompanying drawings, wherein:

FIG. 3 shows an example of first conversion table in the first embodiment;

FIG. 5 shows an example of second conversion table for a second target program in the first embodiment;

FIG. 10 shows an example of first conversion table in a third embodiment;

FIGS. 11A and 11B show examples of second conversion tables for target programs A and B in the third embodiment, respectively;

FIGS. 12A and 12B show examples of second conversion tables for target programs A and B in the third embodiment, respectively;

DETAILED DESCRIPTION OF THE PREFERRED EMBODIMENTS

Embodiments of the present invention will be described hereinafter with reference to the drawings.

FIRST EMBODIMENT

In a first embodiment, a compiling method, compiling device, recording medium with a compiling program stored therein, and a recording medium with a conversion table stored therein according to the present invention will be described.

First, a configuration of the first embodiment will be described with reference to FIGS. 1 and 2.

Figure 1:
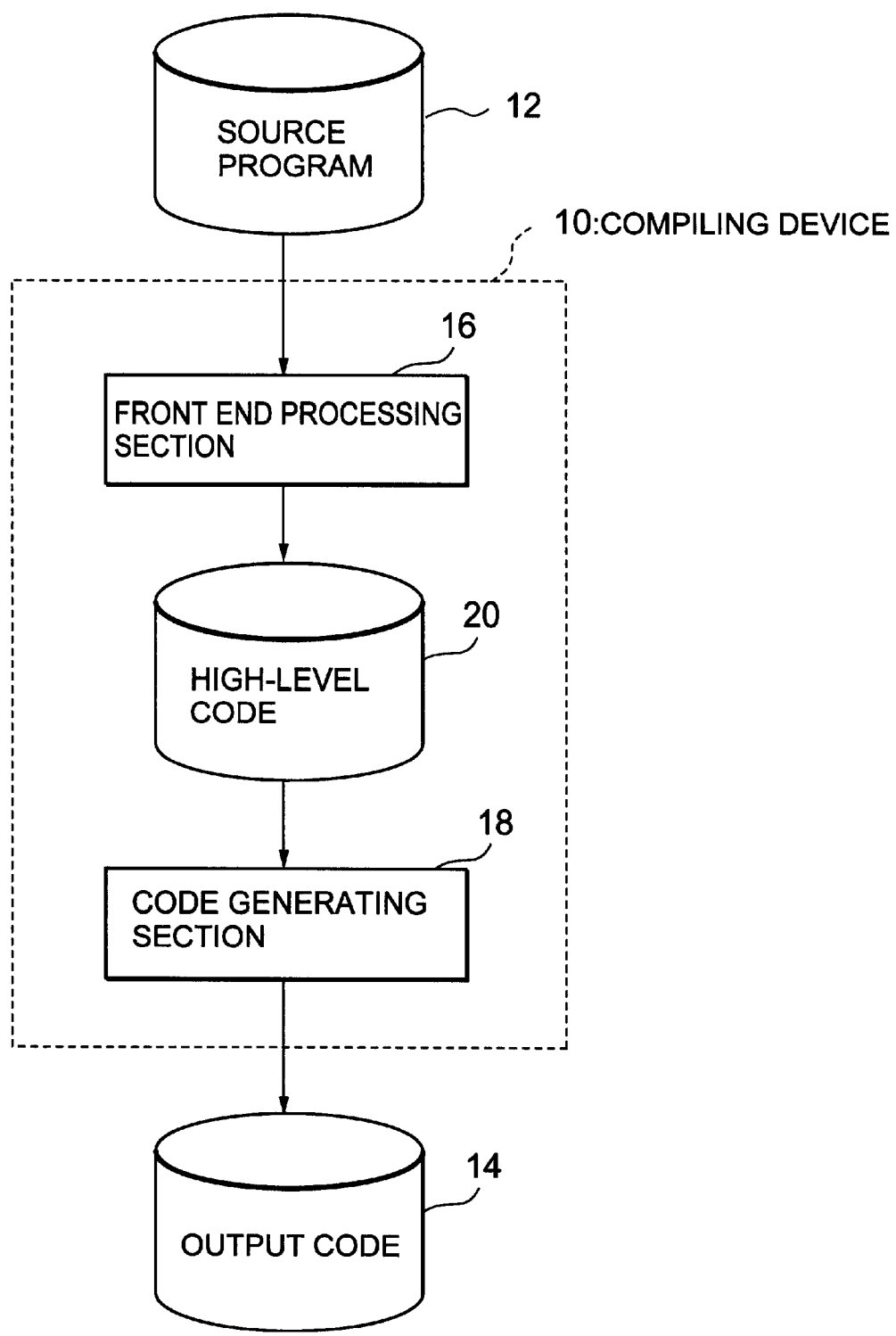
FIG. 1 is a block diagram showing an entire configuration of a first embodiment.
Figure 2:
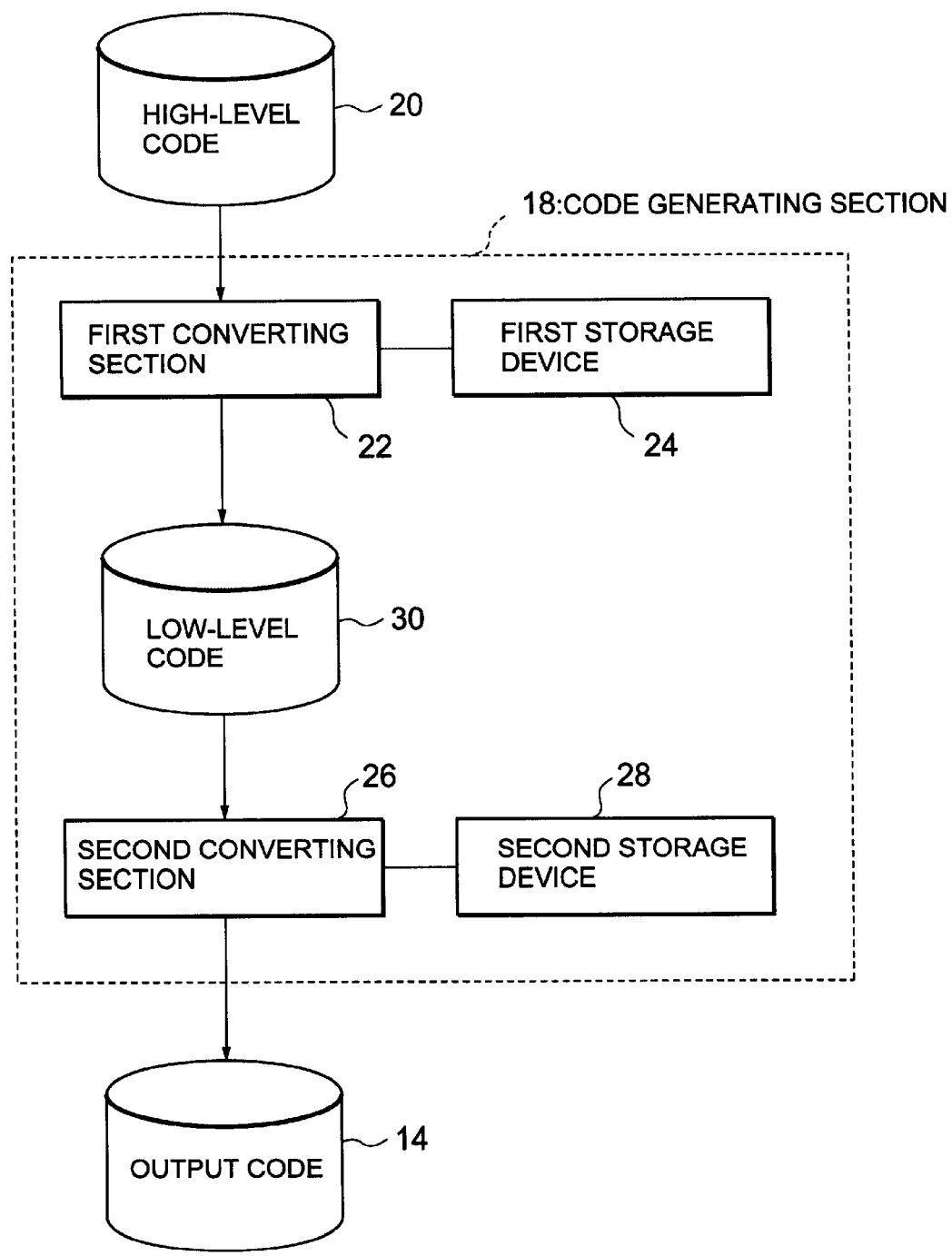
FIG. 2 is a block diagram showing a configuration of code generating section in the first embodiment.

FIG. 1 is a block diagram showing an entire configuration of the first embodiment. FIG. 2 is also a block diagram showing a configuration of a code generating section.

Referring to FIG. 1, a compiling device 10 of the first embodiment is a device for generating a code 14 for a target program operated in a target processor (hereinafter referred to as the output code 14) from a source program 12, comprising a front end processing section 16, and a code generating section 18.

The front end processing section 16 performs a semantic analysis of the inputted source program 12 to generate a high-level intermediate language code 20 independent of a target program type from a code of source program 12 (hereinafter referred to as the high-level code 20). Additionally, for a method of semantic analysis in the front end processing section 16, the same method as that in the prior art can be used.

Moreover, the code generating section 18 generates the output code 14 from the high-level code 20. Referring to FIG. 2, the code generating section 18 is provided with a first converting section 22, first storage device 24, second converting section 26, and second storage device 28.

The first converting section 22 refers to a first conversion table stored in the first storage device 24 to generate a low-level intermediate language code 30 (hereinafter referred to as the low-level code 30) from the high-level code 20.

FIG. 3 shows an example of first conversion table. Referring to FIG. 3, in a first conversion table 32, the high-level codes 20 are stored on the left side of the table, and the corresponding low-level codes 30 are stored on the right side.

In the example shown in FIG. 3, stored as the high-level codes 20 are "cmp_and_br_LT", "relop_EQ_float", "cmp_and_br_LE", "cmp_and_br_GE" and "cmp_and_br_GT". Moreover, CMPLT and BNEQ as the low-level codes 30 corresponding to "cmp_and_br_LT", CMPFEQU and BFF as the low-level codes 30 corresponding to "relop_EQ_float", GMPLT and EBEQU as the low-level codes 30 corresponding to "cmp_and_br_LE", CMPLT and BEQU as the low-level codes 30 corresponding to "cmp_and_br_GE", and CMPLT and EBNEQ as the low-level codes 30 corresponding to "cmp_and_br_GT" are stored, respectively.

Additionally, one-to-one correspondence does not need to be established between the high-level code 20 and the low-level code 30. As shown in FIG. 3, a plurality of low-level codes 30 may correspond to one high-level code 20. The plurality of low-level codes associated with one high-level code 20 are hereinafter referred to together as the low-level code pattern.

Moreover, the second converting section 26 refers to the second conversion table stored in the second storage device 28 to generate the output code 14 from the low-level code 30.

Figure 4:
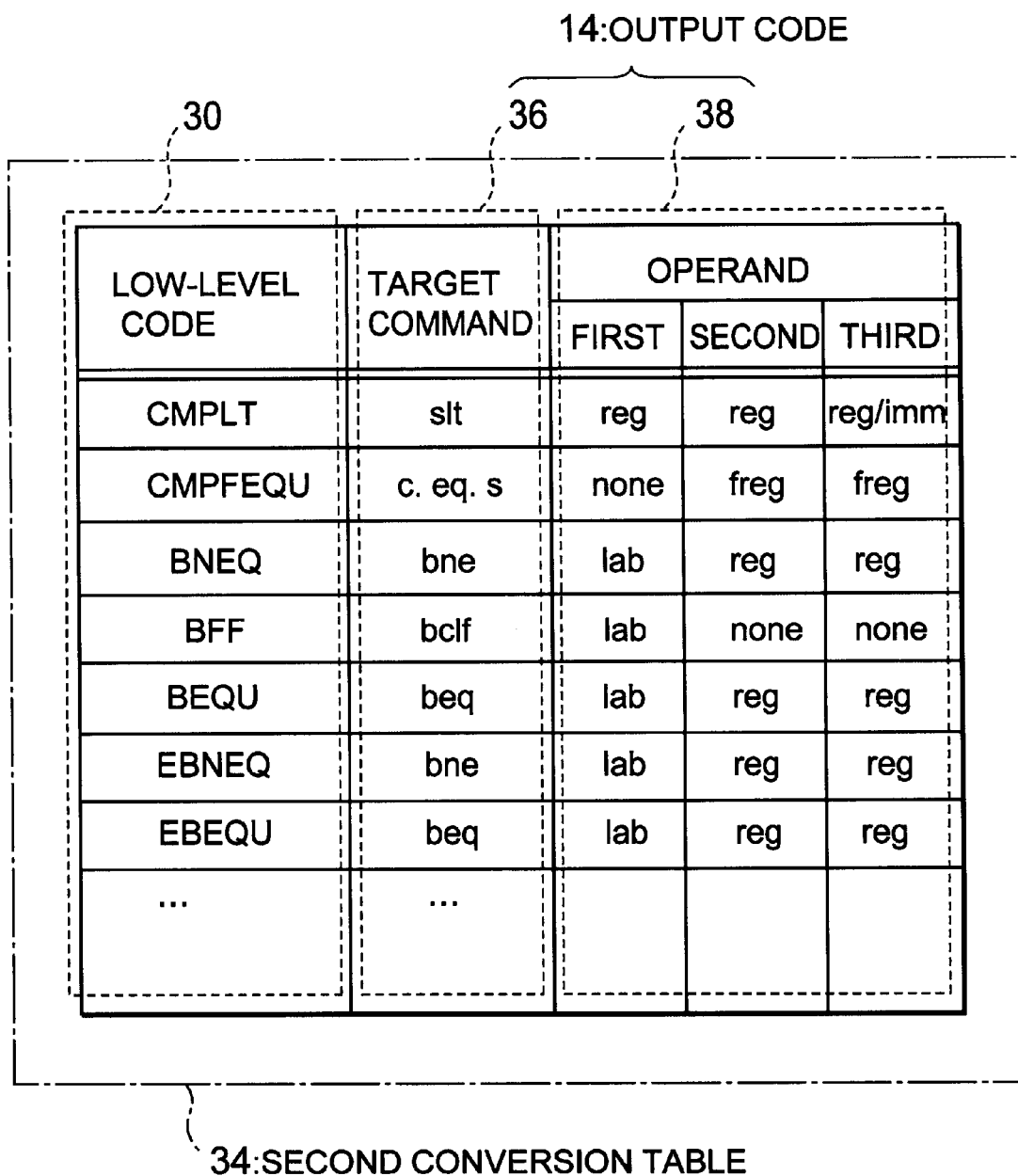
FIG. 4 shows an example of second conversion table for a first target program in the first embodiment.

FIG. 4 shows an example of second conversion table.

The low-level codes 30 are associated with output codes 14 for the second target program, indicating functions the same as or similar to the output codes 14 in the second conversion table 34 of FIG. 4.

Specifically, low-level code CMPLT is associated with target command "lt.w" of output code in the second conversion table 34a. The "lt.w" indicates the function of less-than comparison and setting, and is substantially the same as "slt" in the second conversion table 34. Moreover, referring to the second conversion table 34a, in the operands 38 of "lt.w", first operand has an attribute of "reg/imm", while second and third operands have an attribute of "reg".

Moreover, low-level code CMPFEQU is associated with target command "cmpeq.s" of output code in the second conversion table 34a. The "cmpeq.s" indicates substantially the same function as "c.eq.s" in the second conversion table 34. Further referring to the second conversion table 34a, in the operands 38 of "cmpeq.s", first operand has an attribute of "none", while second and third operands have an attribute of "freg".

Furthermore, low-level code BNEQ is associated with target command "jne" of output code in the second conversion table 34a. The "jne" indicates substantially the same function as "bne" in the second conversion table 34. Further referring to the second conversion table 34a, in the operands 38 of "jne", first and second operands have an attribute of "reg", while third operand has an attribute of "lab".

Moreover, low-level code BEF is associated with Referring to FIG. 4, in a second conversion table 34, the low-level codes 30 are stored on the left side of the table, while the corresponding output codes 14 are stored on the right side. In the second conversion table 34, the output code 14 is represented by a combination of target command (operator) 36 and operand 38. Moreover, first to third operands can be designated as the operand 38, which can be provided with different operand attributes.

In the example shown in FIG. 4, CMPLT, CMPFEQU, BNEQ, BFF, BEQU, EBNEQ and EBEQU are stored as the low-level codes 30. The low-level code 30 and the output code 14 have one-to-one correspondence.

Specifically, the low-level code CMPLT is associated with target command "slt" of output code 14. The target command "slt" indicates a function of a command having three registers as the operands 38, for first comparing first and second register values, setting a non-zero value in a third register when the first register value is smaller than the second register value, otherwise setting a zero value to the third register. The function is hereinafter referred to as the less-than comparison and value setting.

Referring to the second conversion table 34, among the operands 38 of "slt", first and second operands have attributes "reg", while third operand has an attribute "reg/imm". Additionally, "reg" indicates a register, and "reg/imm" indicates a register or an immediate value. Moreover, the operand attribute of the immediate value indicates that the operand corresponds to the change content Referring to the second conversion table 34, in the operands 38 of "bclf", first operand has an attribute of "lab", while second and third operands have an attribute of "none".

Additionally, the first and second conversion tables 32, 34 are recorded and provided, for example, in FD (floppy disc), hard disc or another magnetic recording medium, magneto-optical recording medium, CD-ROM or another optical recording medium, and another arbitrary, preferable recording medium.

Here, since the high-level code independent of the target program and the low-level code are associated, one first conversion table 32 is sufficient irrespective of the target program type.

On the other hand, since the low-level code 30 independent of the target program and the target program output code 14 are associated, the second conversion table 34 needs to be prepared in accordance with the target program type. For example, the second conversion table 34 is prepared for the first target program, but in order to generate output codes for a second target program, a separate second conversion table 34a shown in FIG. 5 needs to be prepared.

The low-level codes CMPLT, CMPFEQU, BNEQ, BFF, BEQU, EBNEQ and EBEQU in the second conversion table 34 for the first target program are used as the low-level codes 30 also in the second conversion table 34a for the second target program. of program.

Furthermore, low-level code CMPFEQU is associated with target command "c.eq.s" of the output code 14. The target command "c.eq.s" indicates a function of a command having two registers for floating point as operands, for setting a flag for floating point when values of two floating point registers are equal to each other, otherwise setting no flag for floating point.

Referring to the second conversion table 34, in the operands 38 of "c.eq.s", first operand has an attribute of "none", while second and third operands have an attribute of "freg". Additionally, "none" indicates that there is no operand, and "freg" indicates a floating point register.

Moreover, low-level code BNEQ is associated with target command "bne" of the output code 14. The target command "bne" indicates a function of a command having two registers and one label as operands, for shifting control to an address indicated by the label when two register values are equal to each other.

Referring to the second conversion table 34, in the operands 38 of "bne", first operand has an attribute of "lab", while second and third operands have an attribute of "reg". Additionally, "lab" indicates a label.

Furthermore, low-level code BFF is associated with target command "bclf" of the output code 14. The target command "bclf" indicates a function of a command having one label as the operand, for shifting control to an address indicated by the label when no floating point flag is set. target command "jff" of output code in the second conversion table 34a. The "jff" indicates substantially the same function as "bclf" in the second conversion table 34. Further referring to the second conversion table 34a, in the operands 38 of "jff", first operand has an attribute of "lab", while second and third operands have an attribute of "none".

As described above, in the present invention, the correspondence (independent of the target program) of high-level and low-level codes is stored in common in the first conversion table, and only the correspondence of low-level code and output code (variable in accordance with the target program) is stored in the second conversion table for each target program. Therefore, the change amount of conversion table accompanied with the change of target processor can be reduced by the amount made common in the first conversion table.

The operation of a compiling device of the first embodiment, i.e., a compiling processing will next be described.

The compiling processing is realized when a program (compiler) for performing the compiling processing is read by a computer, and the computer executes the processing according to program instructions. Moreover, for example, FD (floppy disc), hard disc or another magnetic recording medium, magneto-optical recording medium, CD-ROM or another optical recording medium, and another arbitrary, preferable recording medium can be used as the recording medium storing the program.

Moreover, when the program stored in the recording medium is read by the computer, for example, CD-ROM may be mounted on the computer for reading, or the program may be transferred to the computer from outside via a communication channel.

Figure 6:
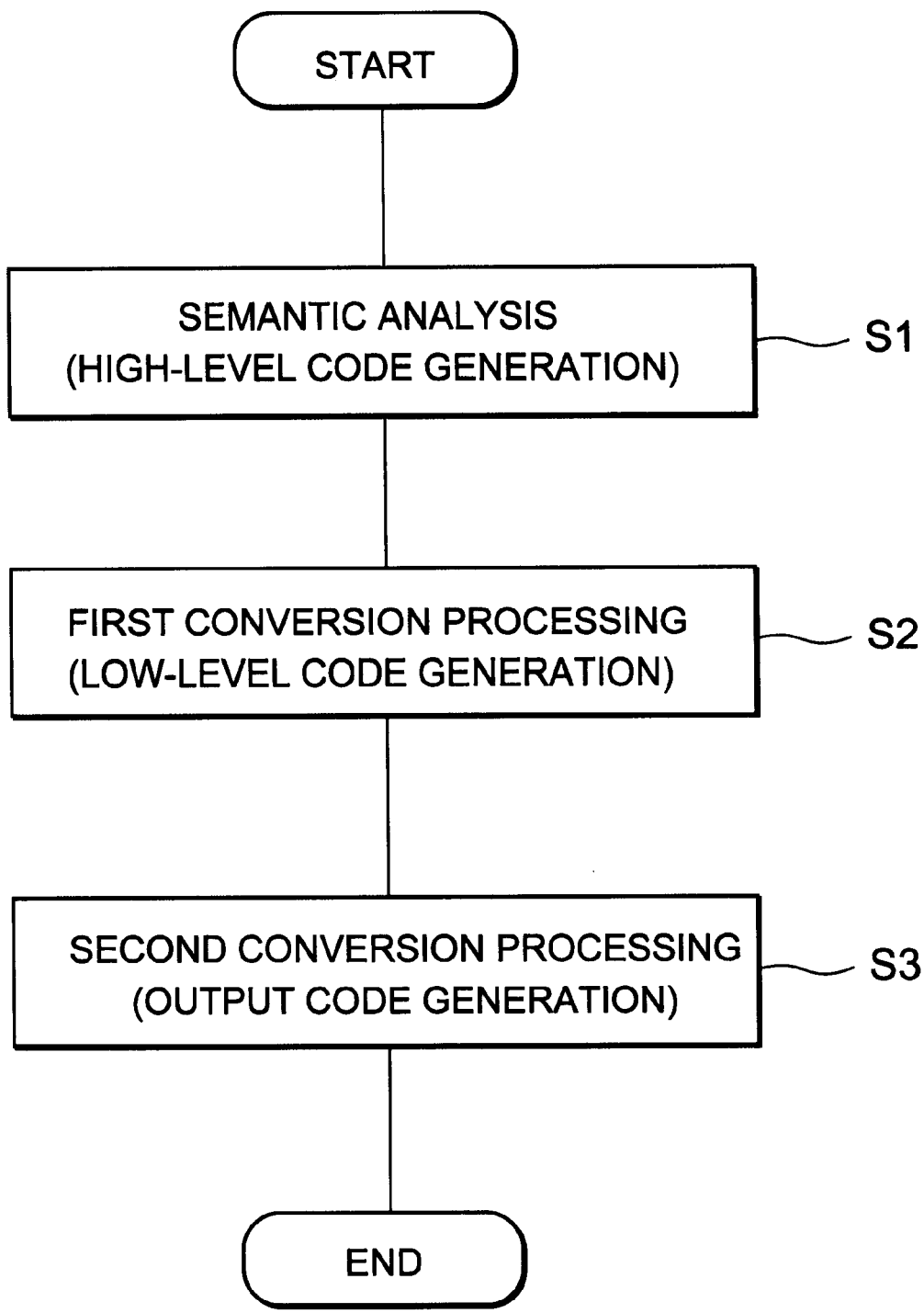
FIG. 6 is a flowchart showing a flow of entire processing of the first embodiment.

FIG. 6 is a flowchart showing an entire processing flow of the first embodiment.

First, when the source program 12 is transmitted to the front end processing section 16 of the compiling device 10 shown in FIG. 1, the front end processing section 16 performs the semantic analysis of the source program 12. The same method of semantic analysis as in the prior art may be used. Subsequently, the front end processing section 16 generates the high-level code 20 from the source program 12. The high-level code 20 is not dependent on the target program type (S1).

Subsequently, the high-level code 20 generated in the front end processing section 16 is transferred to the code generating section 18.

Subsequently, when the high-level code 20 is transmitted to the first converting section 22 of the code generating section 18 shown in FIG. 2, the first converting section 22 performs a first conversion processing. In the first conversion processing, the low-level code 30 is generated from the high-level code 20 (S2).

Figure 7:
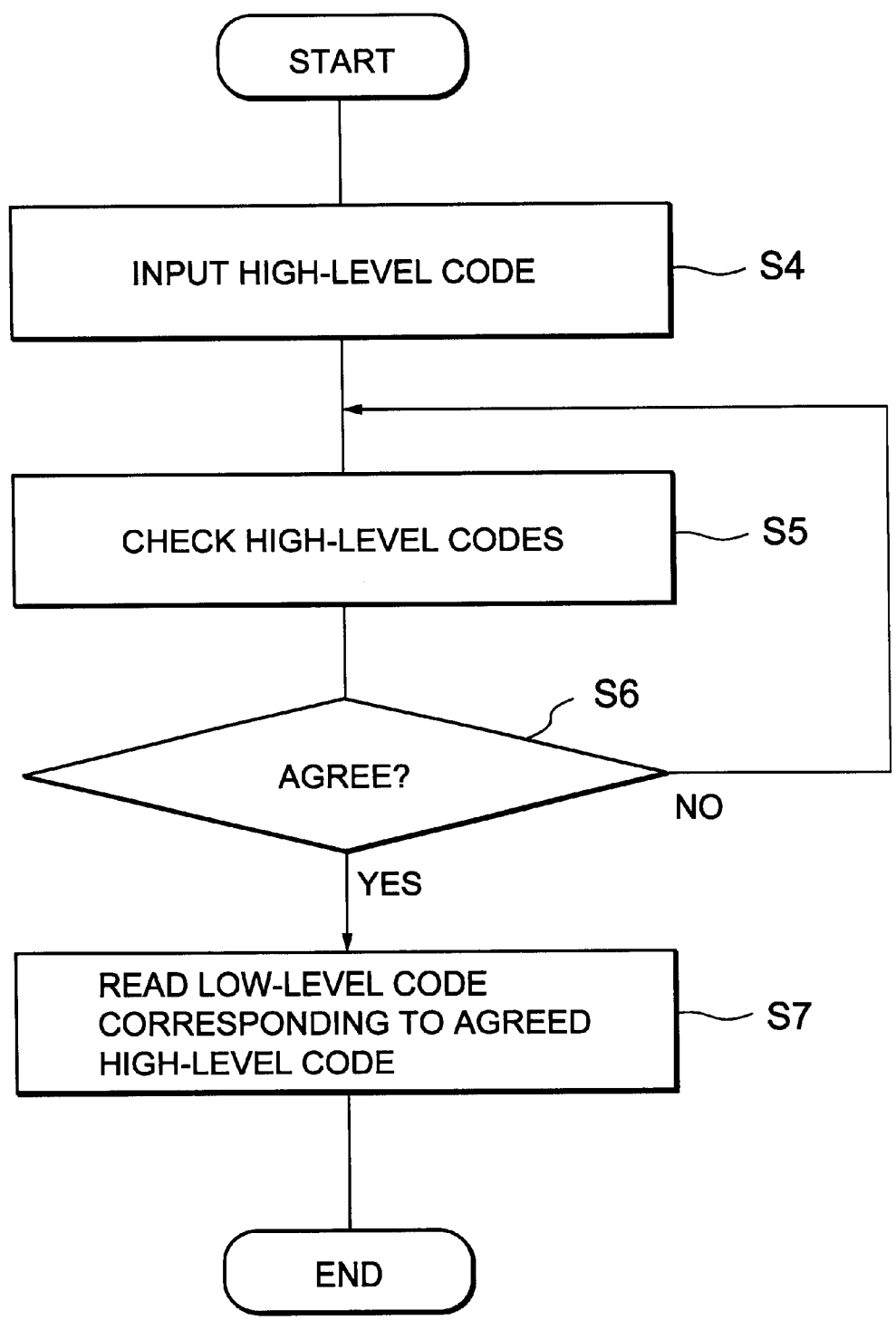
FIG. 7 is a flowchart showing a flow of first conversion processing in the first embodiment.

Here, the first conversion processing will be described with reference to FIG. 7.

In the first conversion processing, when the high-level code 20 is transmitted to the first converting section 22 (S4), the first converting section 22 checks the high-level code 20 with the first conversion table 32 stored in the first storage section 24 (S5). Here, for example, "cmp_and_br LT" is transmitted as the high-level code 20 to the first converting section 22.

During checking, the high-level codes of the first conversion table 32 are read one by one, and it is determined whether or not the code agrees with the inputted high-level code (S6).

Subsequently, when the high-level codes disagree, the next high-level code is successively read until they agree. Moreover, when they agree, the low-level code 30 corresponding to the agreed high-level code in the first conversion table is read from the first storage section 24. Here, the low-level codes CMPLT and BNEQ corresponding to high-level code "cmp_and_br_LT" are read (S7). The first converting section 22 generates the low-level code 30 from the high-level code 20 in this manner.

Subsequently, the low-level code 30 generated by the first converting section 22 is transferred to the second converting section 26.

Subsequently, when the low-level code 30 is transmitted to the second converting section 26 of the code generating section 18 shown in FIG. 2, the second converting section 26 performs a second conversion processing. In the second conversion processing, the output code 14 is generated from the low-level code 30 (S3).

Figure 8:
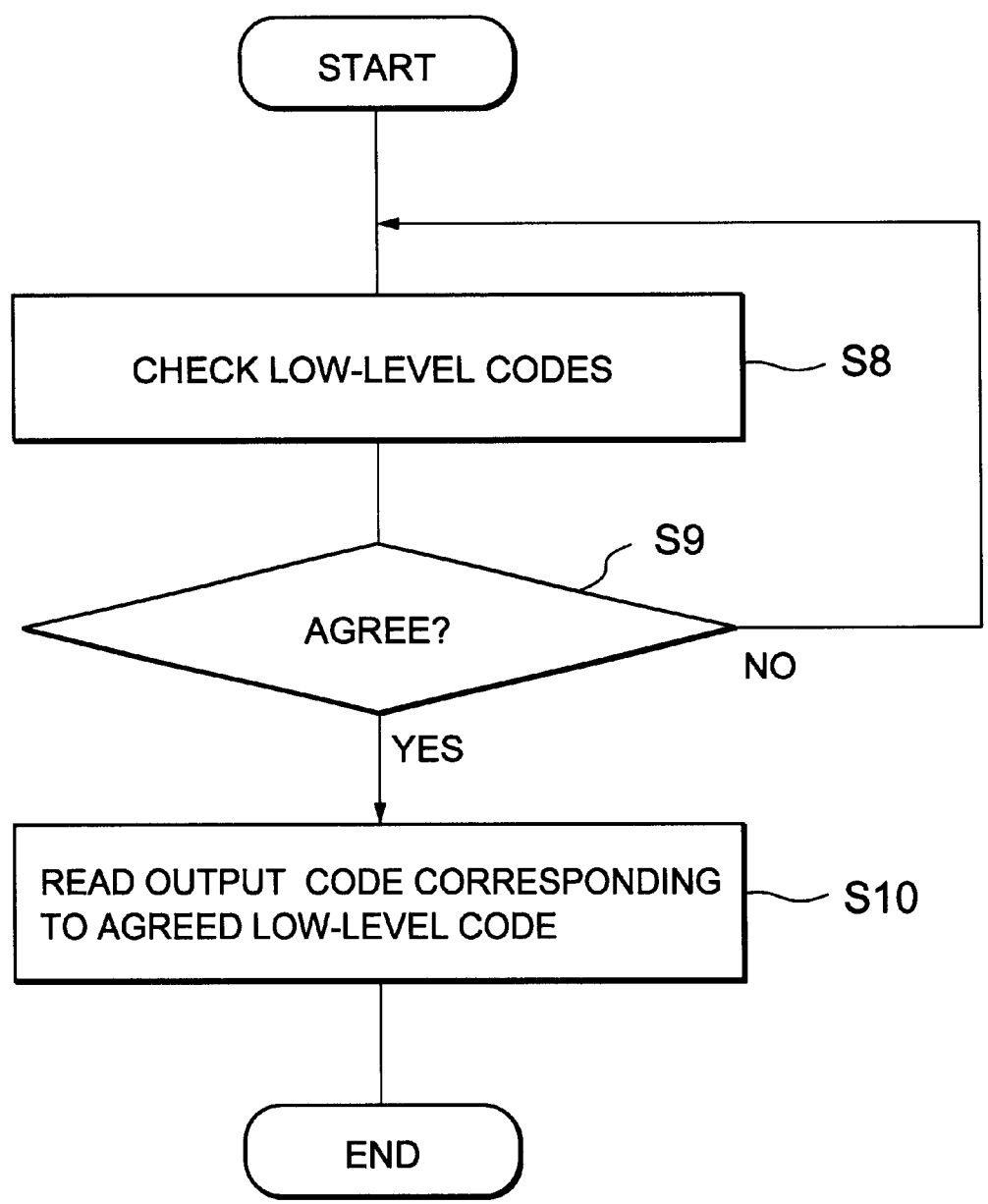
FIG. 8 is a flowchart showing a flow of second conversion processing in the first embodiment.

The second conversion processing will be described hereinafter with reference to FIG. 8. Here, an example of generating the output code 14 for the first target program will be described with reference to the second conversion table 34 shown in FIG. 4.

In the second conversion processing, when the low-level code 30 is transmitted to the second converting section 26, the second converting section 26 checks the low-level code 30 with the second conversion table 34 stored in the second storage section 28 (S8). Here, for example, CMPLT is transmitted as the low-level code 30 to the second converting section 26.

During checking, the low-level codes of the second conversion table 34 are read one by one, and it is determined whether or not the code agrees with the inputted low-level code (S9).

Subsequently, when they disagree, the next low-level code is successively read until the low-level codes agree. Moreover, when they agree, the output code 14 corresponding to the agreed low-level code in the second conversion table 34 is read from the second storage section 28. Here, target command "slt" and its operands "reg", "reg", "reg/imm" are read as the output codes 14 corresponding to the low-level code CMPLT (S10). The second converting section 26 generates the output code 14 from the low-level code 30 in this manner.

Subsequently, the compiling device 10 outputs the output code 14.

SECOND EMBODIMENT

Figure 9:
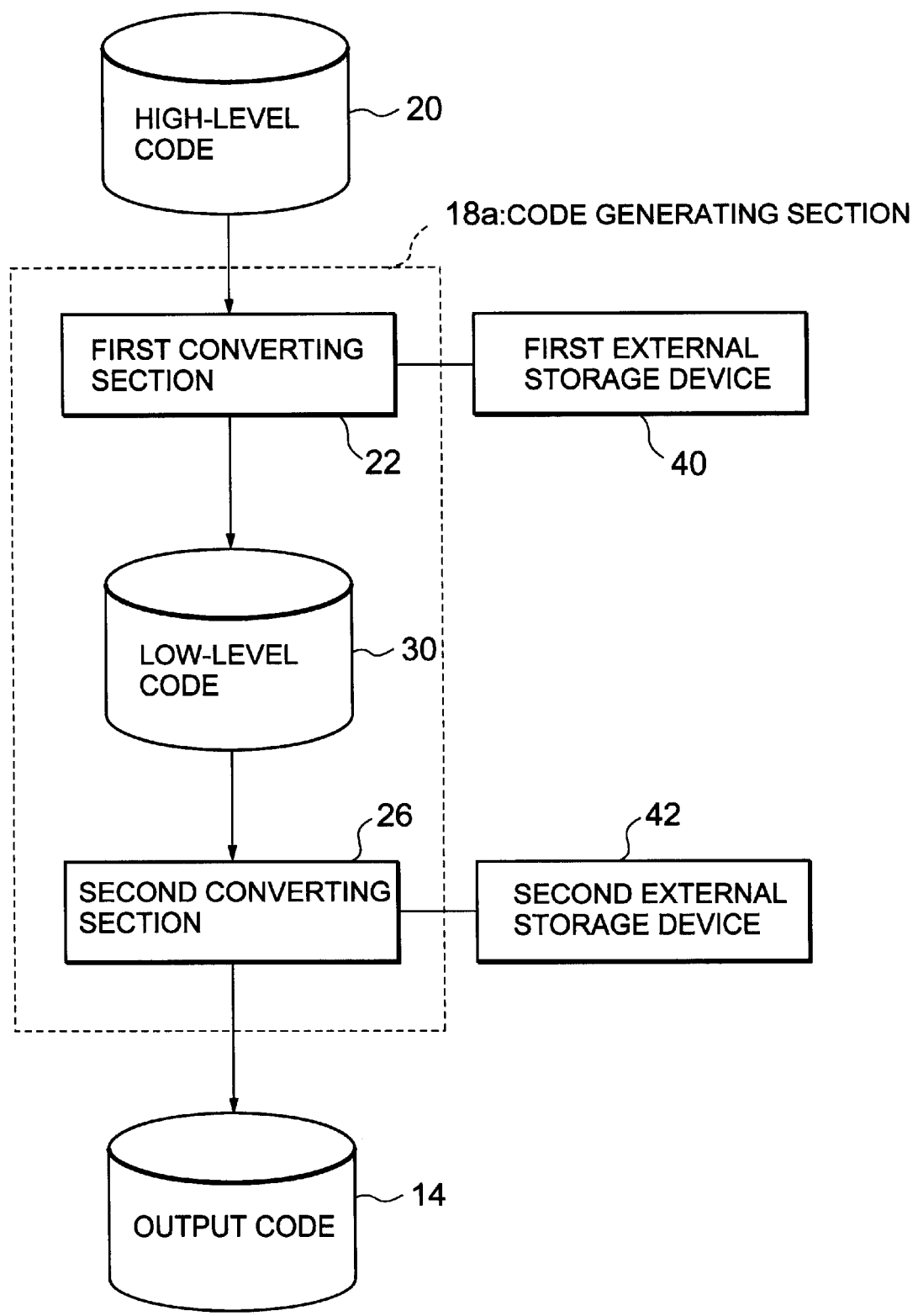
FIG. 9 is a block diagram showing a configuration of code generating section in a second embodiment.
Figure 13:
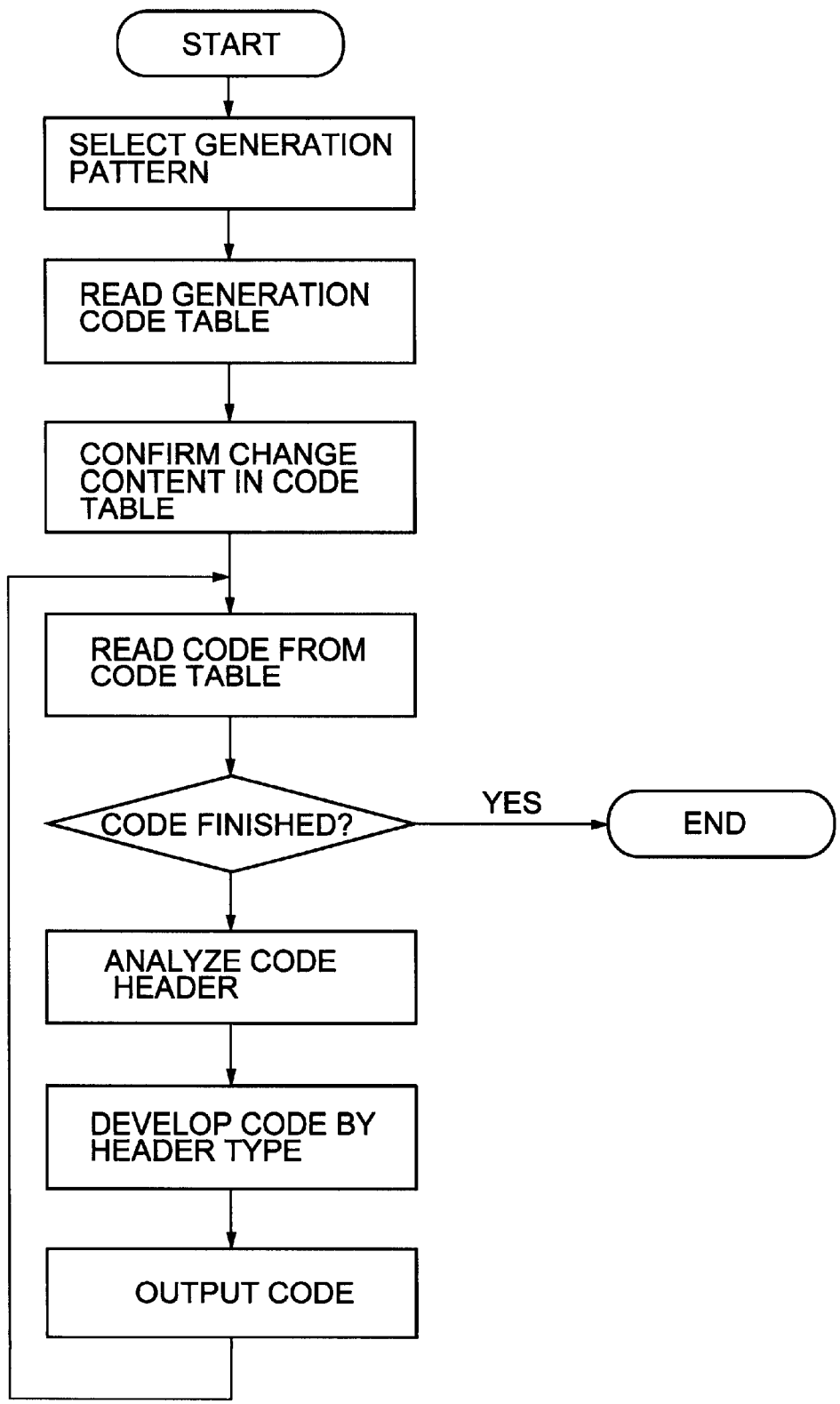
FIG. 13 is a flowchart showing a processing flow of a first conventional example.
Figure 14:
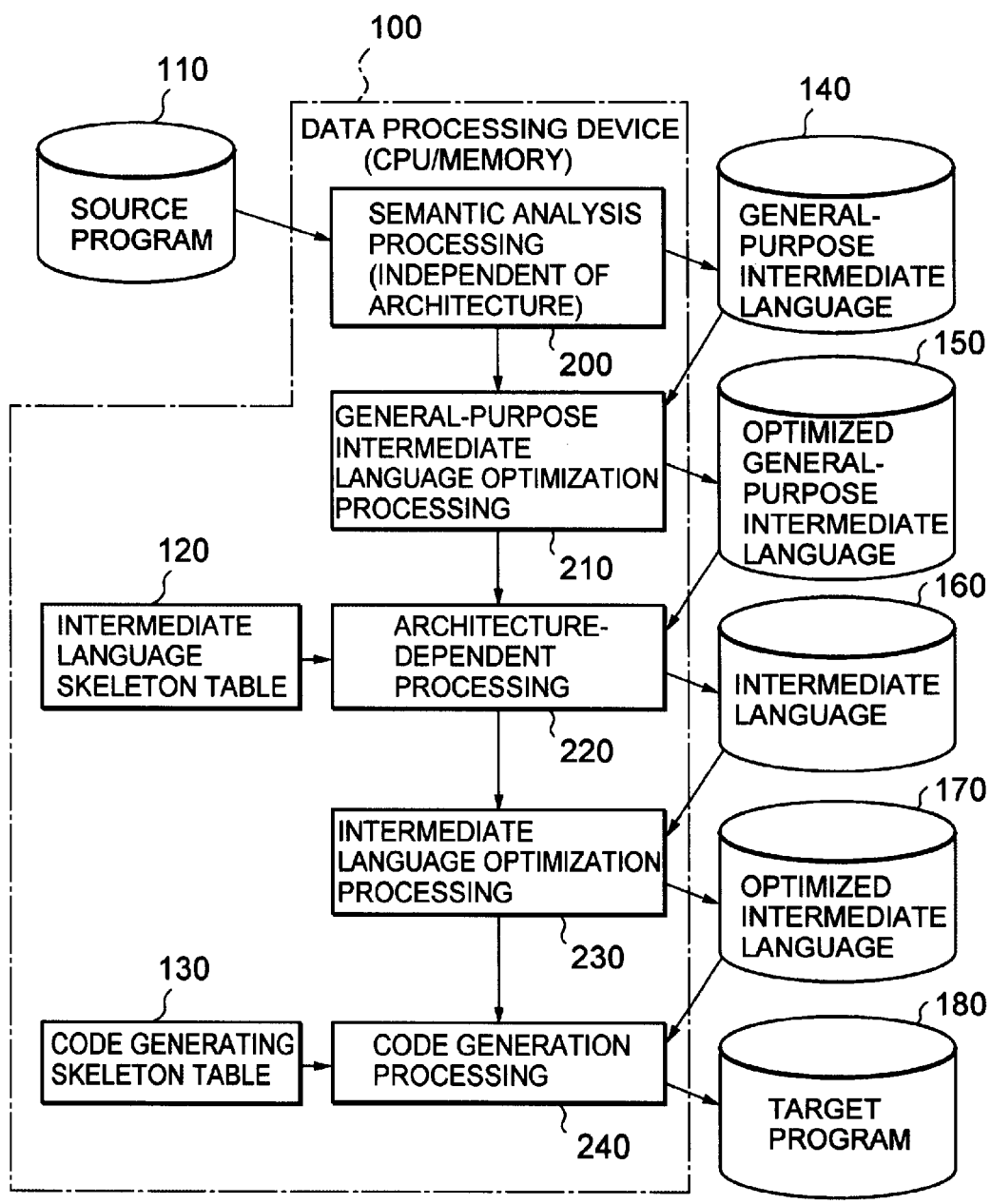
FIG. 14 is a block diagram showing a configuration of a second conventional example.

A second embodiment of the present invention will next be described with reference to FIG. 9. FIG. 9 is a block diagram showing a configuration of code generating section 18a in the second embodiment.

In the second embodiment, first and second conversion tables 32, 34 are stored in external storage devices. Specifically, the first conversion table 32 is stored in a first storage device 40. Moreover, the second conversion table 34 is stored in a second storage device 42.

Here, to store the conversion table in the external storage device includes, for example, a case where the conversion table comprises a program or a file separate from the program for operating the code generating section. Moreover, the first converting section 22 may be connected to the first external storage device 40, for example, via a communication channel. Furthermore, the second converting section 26 may also be connected to the second external storage device 42, for example, via the communication channel.

Additionally, in the second embodiment, since a configuration and operation are the same as those in the first embodiment, except that the first and second conversion tables 32, 34 are stored in the external storage devices, a detailed description thereof is omitted.

THIRD EMBODIMENT

In a third embodiment, an example of generating output codes from high-level code "ADD_M_M mem1, mem2, reg$" will be described. High-level code command "ADD_M_M" in the high-level code indicates a function of loading a register with two pieces of data on a memory to perform addition. The high-level code command is provided with operands "mem1", "mem2", and "reg$". The "mem1" indicates the data on a first memory, while "mem2" indicates the data on a second memory. Moreover, "reg$" indicates the register for storing results.

When the high-level code is represented, for example, by output codes for target program A, they are "ld.w mem1, treg1", "ld.w mem2, treg2" and "add reg1, treg2, reg$". In this case, "ld.w" indicates a command for loading wide size data, "treg1" and "treg2" indicate registers for temporarily storing intermediate results, and "add" indicates a command for addition.

Moreover, when the high-level code is represented, for example, by output codes for target program B, they are "lw treg1, mem1", "lw treg2, mem2" and "add reg$, treg1, treg2". In this case "lw" indicates a command for loading the wide size data.

As described above, the output codes corresponding to one high-level code usually vary with each target program. Therefore, for example, in the first conventional example, the conversion table for target program A and the conversion table for target program B need to be separately prepared.

In the present invention, however, the correspondence of the high-level and low-level codes (independent of the target program) is stored in common to the first conversion table, and only the correspondence of the low-level code and output code (variable in accordance with the target program) is stored in the second conversion table for each target program. An example of the correspondence will be described hereinafter with reference to examples of the first and second conversion tables.

First, the example of first conversion table will be described with reference to FIG. 10. In the first conversion table 44 of FIG. 10, the high-level code is associated with the low-level code. The high-level code comprises a high-level code command (high-level operator) and its operand. First to third operands can be designated as the operand, and can be provided with different operand attributes.

Specifically, in the first conversion table 44, an example of high-level code "ADD_M_M" is indicated. The high-level code command is provided with operands "mem1", "mem2" and "reg$".

Moreover, the low-level code comprises a low-level code command (low-level operator) and its operand. First to third operands can be designated as the operand, and can be provided with different operand attributes.

Specifically, in the first conversion table 44, "LDW mem1, treg1", "LDW mem2, treg2" and "ADD treg1, treg2, reg$" are indicated as the low-level codes.

The first conversion table can be shared for the target programs A and B, as described later.

An example of second conversion table 46 for target program A will next be described with reference to FIG. 11A. In the second conversion table 46 shown in FIG. 11A, the low-level code and output code are associated. The low-level code includes a low-level code command (low-level operator) and its operand. Furthermore, the operand includes first, second and third operands, which are provided with different operand attributes.

Moreover, the output code includes an output code command (output operator), and its operand. The operand further includes first, second, third operands, which are provided with different operand attributes.

In the second conversion table 46, "LDW mem, reg" is indicated as the low-level code, and "ld.w mem, reg" is indicated as the output code for target program A corresponding to the low-level code. Furthermore, "ADD reg1, reg2, reg3" is indicated as the low-level code, and "add reg1, reg2, reg3" is indicated as the output code for target program A corresponding to the low-level code.

An example of second conversion table 46a for target program B will next be described with reference to FIG. 11B. In the second conversion table 46a shown in FIG. 11B, "LDW mem, reg" is indicated as the low-level code, and "lw reg, mem" is indicated as the output code for target program B corresponding to the low-level code. Furthermore, "ADD reg1, reg2, reg3" is indicated as the low-level code, and "add reg3, reg1, reg2" is indicated as the output code for target program B corresponding to the low-level code.

As shown in FIGS. 11A and 11B, the low-level codes are common in the second conversion tables 46 and 46a. Therefore, the first conversion table 44 shown in FIG. 10 can be used in both the target programs A and B. For example, when the target program A is changed to the target program B, the first conversion table does not need to be changed.

FOURTH EMBODIMENT

In a fourth embodiment, another example of developing the change content dependent on target program into a generation code when generating the output code from the low-level code will further be described.

Here, FIG. 12A shows an example of second conversion table 48 for target program A, while FIG. 12B shows an example of second conversion table 48a for target program B.

In each of the second conversion tables 48 and 48a, low-level code command "ANDI" and its three operands "imm", "reg1" and "reg2" are indicated. Additionally, "imm" indicates an integer immediate value.

In the embodiment, each of the second conversion tables 48 and 48a is provided with "andi" as an output code command of output code.

In the second conversion table 48 for target program A, however, "andi" is provided with the same operands as the operands of the low-level code "imm", "reg1" and "reg2", while in the second conversion table 48a for target program B, "reg2", "posimm" and "reg1" are provided as operands. Additionally, "posimm" indicates a positive immediate value. Specifically, in the target program B, since there is a specification restriction (regulation) of output code, a negative numeral cannot be written as the integer immediate value.

In this case, unless the operand is designated, a negative immediate value could be written in the output code for target program B. Therefore, it is difficult to accurately perform the compiling processing.

In this respect, the compiling processing is correctly performed by designating "posimm" as the operand.

In the embodiments, the examples in which the present invention is embodied under specified conditions have been described, but the present invention can variously be modified. For example, in the embodiment, the second conversion table is prepared for two target processors, but the target processors of the present invention are not limited to two types.

As described above in detail, in the present invention, first the correspondence of the high-level and low-level codes independent of the target program is made common and stored in the first conversion table. Subsequently, in the second conversion table, the output codes indicating the same or similar functions in different target programs is associated with one low-level code.

Therefore, at least a part of correspondent portions of high-level and low-level codes in the first conversion table can be used in common among different types of target programs.

Since at least a part of the conversion table can be made common in this manner, in the present invention, all of the first and second conversion tables do not need to be changed when the type of target processor is changed. Therefore, according to the present invention, the change amount of the conversion table accompanied with the change of target processor type can be reduced.

Moreover, since the change amount of the conversion table can be reduced, the amount of operations for changing the conversion table can be reduced.

Furthermore, in the present invention, when the target processor type is changed, the way of developing the change content dependent on program into the code can be changed by converting the low-level operand to the output operand designated in the second conversion table. As a result, the compiling processing can be performed irrespective of the target processor type. Consequently, the restriction of the target processor type can be relaxed.

What is claimed is:

1. A compiling method comprising a front end processing step of generating a high-level code independent of a target program type from a source program, and a code generating step of generating an output code for a desired target program from the high-level code, the code generating step comprising:

converting said high-level code to a low-level code by referring to a first conversion table prepared in common to the target program, in which said high-level code is associated with said low-level code indicating a function the same as or similar to a function indicated by the high-level code and independent of the target program; and converting said low-level code to the output code for the desired target program by referring to a second conversion table prepared for each target program, in which the low-level code is associated with the output code for the target program indicating a function the same as or similar to the function indicated by the low-level code.

2. The compiling method as claimed in claim 1, wherein at least one of said first conversion table and said second conversion table is stored in an external storage device.

3. The compiling method as claimed in claim 1, wherein said second conversion table includes a low-level operator as said low-level code, and an output operator and an output operand of the output operator as said output code.

4. The compiling method as claimed in claim 3, wherein said second conversion table further includes a low-level operand of said low-level operator as said low-level code.

5. A compiling device comprising a front end processing section for generating a high-level code independent of a target program type from a source program, and a code generating section for generating an output code for a desired target program from the high-level code, said code generating section comprising:

a first conversion table prepared in common to the target program, in which said high-level code is associated with a low-level code indicating a function the same as or similar to a function indicated by the high-level code and independent of the target program;

a first converting section for referring to said first conversion table to convert said high-level code to said low-level code;

a second conversion table prepared for each target program, in which said low-level code is associated with the output code for the target program indicating a function the same as or similar to the function indicated by the low-level code; and a second converting section for referring to said second conversion table to convert said low-level code to the output code for the desired target program.

6. The compiling device as claimed in claim 5, wherein at least one of said first conversion table and said second conversion table is stored in an external storage device.

7. The compiling device as claimed in claim 5, wherein said second conversion table includes a low-level operator as said low-level code, and an output operator and an output operand of the output operator as said output code.

8. The compiling device as claimed in claim 7, wherein said second conversion table further includes a low-level operand of said low-level operator as said low-level code.

9. A recording medium which stores a program for allowing a computer to execute a front end processing of generating a high-level code independent of a target program type from a source program, and a code generation processing of generating an output code for a desired target program from the high-level code, said code generation processing comprising:

a processing of converting said high-level code to a low-level code by referring to a first conversion table prepared in common to the target program, in which said high-level code is associated with said low-level code indicating a function the same as or similar to a function indicated by the high-level code and independent of the target program;

a processing of converting said low-level code to the output code for the desired target program by referring to a second conversion table prepared for each target program, in which said low-level code is associated with the output code for the target program indicating a function the same as or similar to the function indicated by the low-level code.

10. The recording medium as claimed in claim 9, wherein said second conversion table includes a low-level operator as said low-level code, and an output operator and an output operand of the output operator as said output code.

11. The recording medium as claimed in claim 10, wherein said second conversion table further includes a low-level operand of said low-level operator as said low-level code.

12. A recording medium which stores a conversion table for use in a processing of generating a high-level code independent of a target program type from a source program, and generating an output code for a desired target program from the high-level code, said conversion table comprising:

a first conversion table prepared in common to the target program, in which said high-level code is associated with a low-level code indicating a function the same as or similar to a function indicated by the high-level code and independent of the target program; and a second conversion table prepared for each target program, in which said low-level code is associated with the output code for the target program indicating a function the same as or similar to the function indicated by the low-level code.

13. The recording medium as claimed in claim 12, wherein said second conversion table includes a low-level operator as said low-level code, and an output operator and an output operand of the output operator as said output code.

14. The recording medium as claimed in claim 13, wherein said second conversion table further includes a low-level operand of said low-level operator as said low-level code.

15. A program embodied in electric signals, said program allowing a computer to execute a front end processing of generating a high-level code independent of a target program type from a source program, and a code generation processing of generating an output code for a desired target program from the high-level code, said code generation processing comprising:

a processing of converting said high-level code to a low-level code by referring to a first conversion table prepared in common to the target program, in which said high-level code is associated with a low-level code indicating a function the same as or similar to a function indicated by the high-level code and independent of the target program; and a processing of converting said low-level code to the output code for the desired target program by referring to a second conversion table prepared for each target program, in which said low-level code is associated with the output code for the target program indicating a function the same as or similar to the function indicated by the low-level code.

* * * * *